(12) United States Patent
Tselner et al.

(10) Patent No.: US 7,572,330 B2
(45) Date of Patent: Aug. 11, 2009

(54) FRESH CONCRETE AND ADMIXTURE FOR FRESH CONCRETE

(76) Inventors: Mikhail Tselner, Moscow (RU); Satanowskaja Olga Solomonowna Tselner, legal representative, 9 Parkowaja Street, House 6, Apartment 41, Moscow (RU) 105554; Oswald Vocke, Elbchaussee 234, 22605 Hamburg (DE)

( * ) Notice: Subject to any disclaimer, the term of this patent is extended or adjusted under 35 U.S.C. 154(b) by 0 days.

(21) Appl. No.: 10/581,373

(22) PCT Filed: Nov. 26, 2004

(86) PCT No.: PCT/DE2004/002623

§ 371 (c)(1),
(2), (4) Date: Mar. 7, 2008

(87) PCT Pub. No.: WO2005/054150

PCT Pub. Date: Jun. 16, 2005

(65) Prior Publication Data

US 2008/0216716 A1    Sep. 11, 2008

(30) Foreign Application Priority Data

Dec. 3, 2003   (RU) .............................. 2003134910

(51) Int. Cl.
C04B 24/18 (2006.01)
C04B 24/00 (2006.01)
C04B 24/20 (2006.01)
C04B 22/00 (2006.01)
C04B 28/02 (2006.01)
C04B 40/00 (2006.01)

(52) U.S. Cl. .................. 106/809; 106/724; 106/725; 106/727; 106/808; 106/815; 106/823

(58) Field of Classification Search .................. 106/724, 106/725, 727, 808, 809, 815, 823
See application file for complete search history.

(56) References Cited

FOREIGN PATENT DOCUMENTS

| EP | 845444 | 1/2002 |
|---|---|---|
| IT | 1041734 | 1/1980 |
| LV | 10006 | 10/1994 |
| RU | 2114082 | 8/1998 |
| RU | 2177919 C2 * | 1/2002 |
| RU | 2272008 | 3/2006 |
| WO | WO-97/15535 | 5/1997 |
| WO | WO-00/30993 | 3/1999 |
| WO | WO-99/15475 | 4/1999 |
| WO | WO9915475 A1 * | 4/1999 |
| WO | WO0030993 A1 * | 6/2000 |

OTHER PUBLICATIONS

Uncertified English language translation of Russian Technical Standards TS 6-36-0204229-625-90 for Plasticizer C-3.
Uncertified English language translation of Russian Technical Standard TU 2141-084-00209527-99 "fixing salt".

* cited by examiner

*Primary Examiner*—Anthony J Green
(74) *Attorney, Agent, or Firm*—White & Case LLP

(57) ABSTRACT

The invention relates to the composition of fresh concrete and admixtures for fresh concrete and can be used in the construction industry for producing monolithic and precast concrete and reinforced concrete structures, in spraying mixtures and also in the oil extraction industry when producing injection and insulation cement materials.

13 Claims, No Drawings

FRESH CONCRETE AND ADMIXTURE FOR FRESH CONCRETE

The invention relates to the composition of fresh concrete and admixtures for fresh concrete and can be used in the construction industry for producing monolithic and precast concrete and reinforced concrete structures, in spraying mixtures and also in the oil extraction industry when producing injection and insulation cement materials.

Fresh concrete which contains Portland cement (e.g. 32.5 cement corresponding to Russian M400) as well as quartz sand, coarse gravel, water, glycerol and admixtures of the following components (in percent by mass) is known: fixing salt 8.3-12.0, sodium thiocyanate 16-20, arsenic compounds 0.002-0.02, water 72.0-75.7 and the following ratio of components of the fresh concrete (in percent by mass): cement 10-16, coarse gravel 38-62, sand 25-40, glycerol 0.005-0.048, admixtures 0.05-0.25, remainder water (patent of the Russian Federation No. 2081083, 1997).

A lubricant for fresh concrete in the form of a complex modifier comprising the following components (in percent by mass) is known: dispersed mineral component based on silica of the rock type group (product of the clearing of furnaces which melt crystalline limestone and/or ferrosilicochromium and/or silicocalcium and/or fire anthracite) 51.9-94.1. Salts of organic acids 4.7-45.5 and water (remainder) (patent of the Russian Federation No. 2160723, Dec. 20, 2000).

The closest prior art to the fresh concrete which is the subject of the application is fresh concrete which contains cement as well as coarse and/or fine aggregate comprising eruptive rock, metamorphite or stratified rock, iron slag or expanded blast furnace slag, expanded clay construction sand and/or sand, water and admixtures of the following components (in percent by mass): microsilica or pearlite or diatomite or trepel 50-65, superplasticizer C-3 15-20, resin attracting neutralized air or hydrophobized silicone powder 0.1-0.5, Lignopan having a molecular weight of 10-50 kJ 10-12, the content of the admixture in the fresh concrete being from 1 to 5 percent of the cement mass.

The closest prior art to the admixture which is the subject of the application is the admixture for fresh concrete comprising the following components (in percent by mass): microsilica or pearlite or diatomite or trepel 50-65, superplasticizer C-3 15-20, resin attracting neutralized air or hydrophobized silicone powder 0.1-0.5, Lignopan having a molecular weight of 10-50 kJ 10-12 (patent of the Russian Federation No. 2177919, Jan. 10, 2002).

The object of this invention is the acceleration of the setting and hardening of the fresh concrete and an increase in the strength of the concrete.

This object is achieved if, in the fresh concrete which contains cement, coarse and/or fine aggregate as well as water and admixtures with superplasticizer C-3, hydrophobing agent (139-282) and Lignopan B (Russian Application No. 2004130768 of Oct. 21, 2004) having a molecular weight of 10-50 kJ, the admixture indicated comprises antifoam as hydrophobing agent and fixing salt and/or ammonium thiocyanate and/or sodium and/or sodium sulfate ($Na_2SO_4$) and sodium carbonate having the following ratio of components (in percent by mass):

| | |
|---|---|
| superplasticizer C-3 | 0-40 |
| the hydrophobing agent indicated | 0.02-0.06 |
| the Lignopan B indicated | 10-20 |
| fixing salt and/or ammonium thiocyanate and/or sodium and/or sodium sulfate | 40-55 |
| sodium carbonate | 1-2 | having a content of the admixture of 0.6-1.5 percent of the mass of cement. The fresh concrete may contain cement, aggregate and water in the following ratio, kg/m³: cement 300-520, aggregate 1590-2030, water 105-200, coarse or fine aggregate, coarse gravel and/or construction sand as coarse aggregate having a particle size of 5-20 or 5-40 mm, as fine aggregate sand having a particle size of not more than 5 mm, at least one component from the following group: quartz sand, eruptive rock, metamorphic sand, expanded clay sand, iron slag sand and at least one component from the following group as coarse aggregate: eruptive rock gravel, metamorphic gravel, sedimentary rock gravel, iron slag sand, crushed expanded clay, crushed expanded slag.

The object indicated is also achieved if lubricant for fresh concrete contains superplasticizer C-3 as well as hydrophobing agent and Lignopan B having a molecular weight of 10-50 kJ, antifoam as hydrophobing agent (139-282) and fixing salt and/or ammonium thiocyanate and/or sodium and sodium carbonate with the following ratio of components (in percent by mass):

| | |
|---|---|
| superplasticizer C-3 | 0-40 |
| the hydrophobing agent indicated | 0.02-0.06 |
| the Lignopan B indicated | 10-20 |
| fixing salt and/or ammonium thiocyanate and/or sodium and/or sodium sulfate | 40-55 |
| sodium carbonate | 1-2 |

The following components can be used in the fresh concrete:

binder—Portland cement, pozzolana Portland cement, slag Portland cement, rapidly hardening Portland cement, high-alumina cement in a quantity of 300-520 kg/m; coarse aggregate of particle size 5-10 mm or 5-20 mm or 5-40 mm—at least one component of the following group: eruptive rock gravel, metamorphic gravel, sedimentary rock gravel, dumped crushed blast furnace slag, granulated blast furnace slag, crushed expanded clay, crushed expanded slag.

Fine aggregate having a particle size of not more than 5 mm—at least one component of the following group: quartz sand, quartz arkose, limestone sand, eruptive or metamorphic rock sand, iron slag sand and expanded clay sand. The total content of the aggregate in the fresh concrete is from 1590 to 2030 kg/m³, water 105-200 kg/m³.

The ratio of components in the fresh concrete may vary according to the required concrete variety and method of shaping.

The following components may be used for mixing the admixture:

| | |
|---|---|
| Lignopan B - electrolytically modified lignosulfonates having a molecular weight of 10-50 kJ. | |
| hydrophobing agent antifoam | |
| silicone emulsion (139-282) | (Russian quality specification 6-02-1-529-86) |
| superplasticizer C-3 | (Russian quality specification 6-36-0204229-625-90) |

-continued

Lignopan B - electrolytically modified lignosulfonates
having a molecular weight of 10-50 kJ.
hydrophobing agent antifoam

| fixing salt | (Russian quality specification 2141-084-00209527-99) |
|---|---|
| ammonium thiocyanate | |
| sodium carbonate, | | it being possible for fixing salt and ammonium thiocyanate to be added as pure product and/or to be present in a product, for example Koxochemie production. The admixture is made by mixing the components indicated. Compositions of the admixture are shown in table 1. The admixture is used in an amount of 0.6-1.5 percent of the cement mass.

The composition of the fresh concrete and the characteristics of the concrete with this admixture are shown in table 2.

Note: the following compositions of the admixture from table 1 are used in the examples in table 2:
Example 2—composition 1
Example 4—composition 2
Example 6—composition 3
Example 8—composition 4
Example 10—composition 1
Example 12—composition 2
Example 14—composition 3

The test findings indicated show the high efficiency of the admixture Lignopan B-2 according to the invention, the use of which in the concrete in the amount of 0.6-1.5% of the cement mass makes it possible to produce a fresh concrete having accelerated setting and hardening behavior and to achieve a higher strength of the concrete.

TABLE 1

| | Content, parts by mass | | | | | | |
|---|---|---|---|---|---|---|---|
| Components | 1 | 2 | 3 | 4 | 5 | 6 | 7 |
| sodium carbonate | 1 | 1 | 2 | 2 | 1 | 2 | 1 |
| 139-282 | 0.02 | 0.04 | 0.04 | 0.06 | 0.04 | 0.02 | 0.06 |
| superplasticizer C-3 | 0 | 20 | 40 | 30 | 20 | 40 | 30 |
| Lignopan | 10 | 20 | 15 | 20 | 10 | 20 | 20 |
| fixing salt | 55 | — | 40 | 40 | 40 | — | — |
| ammonium thiocyanate | — | 20 | 5 | — | — | — | 5 |
| sodium thiocyanate | — | 30 | — | 5 | — | — | 5 |
| sodium sulfate | — | — | — | — | 10 | 50 | 40 |

TABLE 2

The composition and the characteristics of the fresh concrete comprising the admixture LIGNOPAN B-2

| | Concrete composition | | | | | Fresh concrete characteristics | | | Compressive strength, Mpa | |
|---|---|---|---|---|---|---|---|---|---|---|
| N | cement | sand* | gravel* | water** | admixture*** | slump | water/cement | color | acidic-alkaline | acidic |
| 1 | 300 | 860 | 1050 | 150 | — | 3 | 0.5 | 2 | 9.5 | 22.3 |
| 2 | 300 | 860 | 1050 | 170 | 7 | 3 | 0.37 | 2.77 | 19.8 | 32.7 |
| 3 | 380 | 730 | 1000 | 222 | — | 17 | 0.58 | 1.73 | 5.9 | 26.7 |
| 4 | ? | 730 | 1000 | 169 | 7.5 | 77.5 | 0.42 | 2.37 | 70.7 | 37.5 |
| 5 | 400 | 670 | 1090 | 165 | — | 7.5 | 0.42 | 2.38 | 7.9 | 32.7 |
| 6 | 400 | 670 | 1090 | 124 | 0.7 | 7 | 0.37 | 3.23 | 74.7 | 45.4 |
| 7 | 450 | 690 | 1050 | 247 | — | 18 | 0.55 | 1.82 | 11.8 | 32 |
| 8 | 450 | 690 | 1050 | 160 | 7.4 | 18.5 | 0.36 | 27* | 22.4 | 46.5 |
| 9 | 480 | 700 | 1000 | 220 | — | 19 | 0.46 | 2.18 | 10.5 | 37.8 |
| 10 | 480 | 680 | 1000 | 176 | 7.2 | 19 | 0.37 | 2.77 | 22.7 | 54.6 |
| 11 | 520 | 680 | 1100 | 202 | — | 12 | 0.39 | 2.57 | 17.9 | 45.3 |
| 12 | 520 | 680 | 1100 | 176 | 0.9 | 72 | 0.34 | 2.95 | 37.2 | 67.4 |
| 13 | 550 | 850 | 800 | 214 | — | 1.5 | 0.39 | 2.57 | 26.8 | 50.2 |
| 14 | 550 | 850 | 800 | 7*7 | 0.6 | 7.5 | 0.33 | 3.03 | 36.7 | <<7.3 |

*B
**liter
***percent of the cement mass

The invention claimed is:

1. A fresh concrete comprising, cement, aggregate, water and an admixture, wherein the admixture comprises:
   (a) a mixture of (i) sodium sulfate, (ii) sodium salt of lignosulfonic acid and (iii) sodium salts of polymethylene napthalenesulfonic acids of the general formula

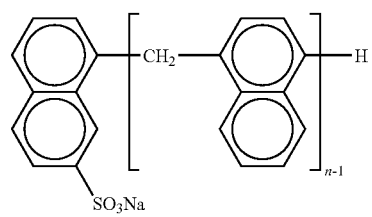

where n is 1 to 25;
   (b) an antifoaming agent comprising a silicone emulsion;
   (c) a modified lignosulfonate having the molecular weight of 10-50 kJ;
   (d) one or more compounds selected from the group consisting of ammonium thiocyanate, sodium thiocyanate and sodium sulfate, and
   (e) sodium carbonate.

2. The fresh concrete as claimed in claim 1, wherein the amount of each of the cement, aggregate and water is within the following range:

| | |
|---|---|
| cement | 300-500 kg/m³ |
| aggregate | 1590-2030 kg/m³ |
| water | 105-200 kg/m³. |

3. The fresh concrete as claimed in claim 1, wherein the aggregate is a coarse aggregate having a particle size 5-40 mm.

4. The fresh concrete as claimed in claim 1, wherein the aggregate is a fine aggregate having a particle size of not more than 5 mm.

5. The fresh concrete as claimed in claim 4, wherein the fresh concrete comprises one or more fine aggregate selected from the group consisting of quartz sand, eruptive rock sand, metamorphic sand, expanded clay sand and iron slag sand.

6. The fresh concrete as claimed in claim 3, wherein the fresh concrete comprises one or more coarse aggregate selected from the group consisting of eruptive rock gravel, metamorphic gravel, sedimentary rock gravel, iron slag gravel, crushed expanded clay and crushed expanded slag.

7. The fresh concrete according to claim 1, wherein sodium sulfate of the one or more compounds (d) comprises purified natural sodium sulfate.

8. The fresh concrete according to claim 1, wherein components comprising the admixture have the following ratio (parts by mass):

| | |
|---|---|
| (a) the mixture of (i), (ii) and (iii) | 0-40 |
| (b) the antifoaming agent | 0.02-0.06 |
| (c) the modified lignosulfonate | 10-20 |
| (d) the one or more compounds selected from the group consisting of ammonium thiocyanate, sodium thiocyanate and sodium sulfate | 40-55 |
| (e) sodium carbonate | 1-2, | and, wherein the content of the admixture is 0.6-1.5 parts by mass of the cement mass.

9. The fresh concrete according to claim 3, wherein the coarse aggregate is gravel and/or construction sand.

10. The fresh concrete according to claim 4, wherein the fine aggregate is sand.

11. An admixture for fresh concrete wherein the admixture comprises:
(a) a mixture of (i) sodium sulfate, (ii) sodium salt of lignosulfonic acid and (iii) sodium salts of polymethylene napthalenesulfonic acids of the general formula

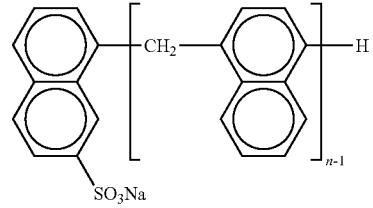

where n is 1 to 25;
(b) an antifoaming agent comprising a silicone emulsion;
(c) a modified lignosulfonate having the molecular weight of 10-50 kJ;
(d) one or more compounds selected from the group consisting of ammonium thiocyanate, sodium thiocyanate and sodium sulfate; and
(e) sodium carbonate.

12. The admixture according to claim 11, wherein sodium sulfate of the one or more compounds (d) comprises purified natural sodium sulfate.

13. The admixture according to claim 11, wherein components comprising the admixture have the following ratio (parts by mass):

| | |
|---|---|
| (a) the mixture of (i), (ii) and (iii) | 0-40 |
| (b) the antifoaming agent | 0.02-0.06 |
| (c) the modified lignosulfonate | 10-20 |
| (d) the one or more component selected from the group consisting of ammonium thiocyanate, sodium thiocyanate and sodium sulfate | 40-55 |
| (e) sodium carbonate | 1-2. |

* * * * *

UNITED STATES PATENT AND TRADEMARK OFFICE
CERTIFICATE OF CORRECTION

| | | |
|---|---|---|
| PATENT NO. | : 7,572,330 B2 | Page 1 of 1 |
| APPLICATION NO. | : 10/581373 | |
| DATED | : August 11, 2009 | |
| INVENTOR(S) | : Mikhail Tselner et al. | |

It is certified that error appears in the above-identified patent and that said Letters Patent is hereby corrected as shown below:

Title Page:
INID Code (76): Inventors:
Delete "Satanowskaja" and substitute therefor "Satanovskaya".

Signed and Sealed this

Thirteenth Day of October, 2009

David J. Kappos
*Director of the United States Patent and Trademark Office*